No. 782,741. Patented February 14, 1905.

UNITED STATES PATENT OFFICE.

EMIL FISCHER, OF BERLIN, GERMANY, ASSIGNOR TO THE FIRM OF E. MERCK, OF DARMSTADT, GERMANY, A COPARTNERSHIP.

DISUBSTITUTED BARBITURIC ACID AND PROCESS OF MAKING SAME.

SPECIFICATION forming part of Letters Patent No. 782,741, dated February 14, 1905.

Original application filed January 22, 1903, Serial No. 140,108. Divided and this application filed August 16, 1904. Serial No. 220,968.

(Specimens.)

*To all whom it may concern:*

Be it known that I, EMIL FISCHER, a subject of the Emperor of Germany, and a resident of Berlin, Germany, have invented certain new and useful Improvements in Disubstituted Barbituric Acids and Processes of Making Same; and I hereby declare the following to be a clear and exact description of my invention.

My invention relates to the production of disubstituted derivatives of barbituric acid.

The present application, which is a divisional application from my application, Serial No. 140,108, filed January 22, 1903, covers the new barbituric acid derivatives, containing as substituting groups two different radicals, such as methyl and ethyl, for which may be substituted any higher homologous and analogous groups described in Examples 4, 6, and 10 of the said application. These new products are characterized by the following general formula:

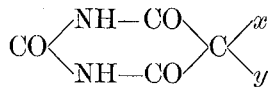

in which $x$ and $y$ represent two different substituting groups of the above description.

According to my researches these new compounds are obtained by condensing disubstituted malonic-acid-ester derivatives containing as substituting groups two different radicals, such as ethyl and methyl, for which may be substituted any higher homologous and analogous groups, with urea in the presence of metal alcoholate. In this manner disubstituted barbituric acids are obtained which form colorless crystals difficultly soluble in cold water, soluble in sodium hydroxid and potassium hydroxid, thus forming salts by the replacement of the hydrogen of the NH group by metal. These products possess therapeutic value as hypnotics, the average dose being 0.5 to one gram.

In carrying out my process practically I can proceed as follows:

1. *Methyl-ethyl-barbituric acid.*—3.4 parts, by weight, of sodium are dissolved in sixty-five parts, by weight, of alcohol. On cooling ten parts, by weight, of methyl-ethyl-molonic-acid ester and 4.5 parts, by weight, of urea are added. The urea having been made to dissolve by moderate warmth, the mixture is heated to 100° to 105° centigrade in a closed vessel for four hours. The hereby-precipitated sodium salt of methyl-ethyl-barbituric acid is then filtered off, and the methyl-ethyl-barbituric acid is split off by decomposing the salt with hydrochloric acid and purified by recrystallization from hot water. On recrystallizing the acid thus obtained it appears in long flat lanceolate crystals, which have the composition $C_7H_{10}O_3N_2$ and melt at 212° centigrade.

2. *Methyl-propyl-barbituric acid* is obtained in the same manner, using as starting material methyl-propyl-malonic-acid ester and urea. The melting-point of this compound is 182° centigrade. The compostion is $C_8H_{12}O_3N_2$.

3. *Ethyl-propyl-barbituric acid.*—Six parts, by weight, of sodium dissolved in one hundred parts, by weight, of alcohol with twenty parts, by weight, of ethyl-propyl-malonic-acid ester and 7.8 parts, by weight, of urea are heated to 100° to 110° centigrade for several hours. Hereby a little sodium carbonate precipitates, while the sodium salt of ethyl-propyl-barbituric acid remains in solution. Therefore to isolate the ethyl-propyl-barbituric acid the alkaline alcoholic solution is diluted with water supersaturated with hydrochloric acid and its alcohol removed by evaporation. The free acid is purified by several recrystallizations from hot water. This acid forms long colorless strongly resplendent needles, which have the composition $C_9H_{14}O_3N_2$ and melt at 146° centigrade.

Although I have above described examples by which the above-described disubstituted barbituric acids may be obtained, nevertheless I do not wish to be understood as thereby excluding equivalents for the ingredients, the apparatus, or the operations employed in the process. It is probable that substitutes may be employed without departing from the scope of the invention intended to be secured hereby. Thus, for example, acetylurea may be employed instead of urea in the described processes without changing the resulting products, as the acetyl group is split off in the reaction.

The new disubstituted barbituric acids possess the property of forming salts with many metals—for example, the alkali metals—the hydrogen of the NH group being replaced by the metal.

Having now described my invention and in what manner the same is to be performed, what I claim as new, and desire to secure by Letters Patent, is—

1. The herein-described new process of making disubstituted barbituric acids, having the general formula

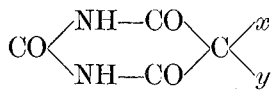

in which $x$ and $y$ represent two different radicals, such as ethyl and methyl, for which may be substituted any higher homologous or analogous groups, consisting in condensing the corresponding disubstituted malonic-acid esters with urea in the presence of metal alcoholate, decomposing the thus-formed sodium salts of the disubstituted barbituric acids by means of acid, producing thereby the free disubstituted barbituric acids.

2. The herein-described new process of making ethyl-propyl-barbituric acid, consisting in condensing ethyl-propyl malonic-acid ester with urea in the presence of metal alcoholate, separating the thus-formed sodium salts of the ethyl-propyl-barbituric acid by filtration and precipitating the free ethyl-propyl-barbituric acid by means of acid.

3. The herein-described new products, being disubstituted barbituric acids, having the general formula:

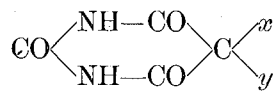

in which $x$ and $y$ represent two different radicals, such as ethyl and methyl, for which may be substituted any higher homologous and analogous groups, and characterized by forming colorless crystals difficultly soluble in hot water and soluble in solutions of alkali and in the salt form of which the hydrogen of the NH group is replaced by the alkali metal.

4. The herein-described new hypnotic ethyl-propyl-barbituric acid which in the acid form consists of colorless crystals and melts at 146° centigrade when recrystallized from hot water and is soluble in solutions of sodium hydroxid and potassium hydroxid and in the salt form of which the metal replaces the hydrogen of the NH group.

In testimony whereof I have signed my name in the presence of two subscribing witnesses.

EMIL FISCHER.

Witnesses:
   E. ALDERHALDEN,
   F. REUTER.